April 10, 1928.

G. KELL 1,665,552

WHEEL PULLER

Filed Oct. 24, 1927

Inventor

G. Kell

By Lacey & Lacey, Attorneys

Patented Apr. 10, 1928.

1,665,552

UNITED STATES PATENT OFFICE.

GEORGE KELL, OF LOUISVILLE, OHIO.

WHEEL PULLER.

Application filed October 24, 1927. Serial No. 228,446.

The present invention is directed to improvements in wheel pullers.

The primary object of the invention is to provide a device of this character so constructed that it can be easily and quickly attached to the wheel hub and conveniently manipulated to pull the wheel from the axle.

Another object of the invention is to provide a device of this character constructed in such manner that upon removal of the hub cap the device can be easily applied to the hub and in order that the feed screw forming a part thereof can be manipulated to exert a yielding pressure upon the axle in order that the wheel can be easily removed.

With these and other objects in view, this invention resides in the novel features of construction, formation, combination and arrangement of parts to be hereinafter more fully described, claimed and illustrated in the accompanying drawing, in which,—

Figure 1:
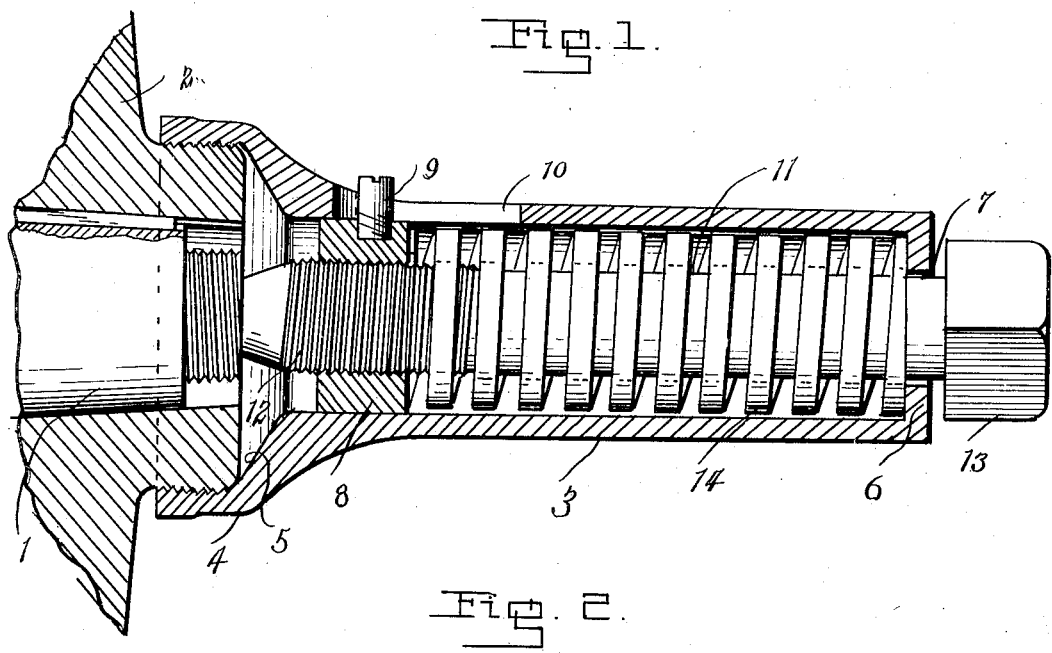
Figure 1 is a longitudinal sectional view through the device, showing it in place upon a wheel hub.
Figure 2:
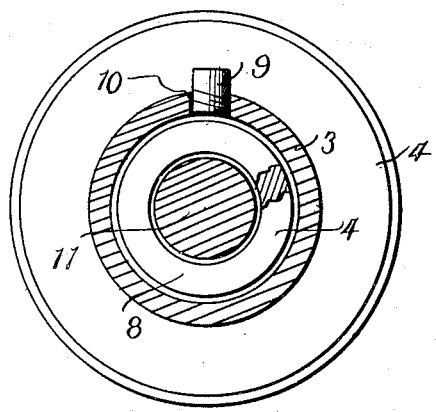
Figure 2 is a transverse sectional view through the same.

Referring to the drawing, 1 and 2 designate, respectively, a portion of a conventional form of axle and hub of a rear wheel of a motor vehicle and upon the axle of which the wheel is pressed.

The puller comprises a sleeve 3 having upon one end a head 4 provided with an interiorly threaded socket 5 adapted for engagement with the usual threads of the hub 2. The other end of the sleeve is provided with a closure plate 6 having a central opening therein, the purpose of which will be later explained.

Slidable in the sleeve is a follower nut 8 which carries a stud 9, said stud being slidable in the longitudinal slot 10 formed in said sleeve and serves to prevent rotation of the nut.

A feed screw 11 is provided and is inserted in the opening 7 and has its threaded end 12 engaged with the nut 8, there being a head 13 upon said screw to facilitate the rotation thereof.

Encircling the shank of the screw 11 is a coil spring 14 which has one end resting against the nut 8 and the other end against the closure plate 6 in order that when the feed screw is rotated the follower nut will move rearwardly and compress said spring.

In use the head 4 is engaged with the hub and the inner end of the screw 11 is engaged with the end of the axle 1. It will be understood that when the head is first engaged with the axle that the inner end of the screw will be flush with the inner end of the follower nut 8. Upon rotating the screw 11 the follower nut will move rearwardly, thus compressing the spring 14, whereupon the screw is struck a sharp blow on the head 13 with a hammer and since the end of the screw is engaged with the axle nut the spring during its expansion will move the sleeve outwardly, thereby pulling the wheel to a position to permit the same to be easily slid from engagement with the axle.

Having thus described the invention, I claim:

1. A wheel puller comprising a sleeve having a head for engagement with the hub of the wheel, a follower nut slidable in the sleeve, a feed screw engaged in the sleeve and with the nut, and a coil spring encircling the feed screw and engaged with the nut, as and for the purpose set forth.

2. A wheel puller comprising a sleeve having a head upon one end for engagement with the hub of the wheel, a closure plate upon the outer end of the sleeve, a follower nut slidable in the sleeve, a feed screw slidable in the closure plate and threaded in the nut and a coil spring encircling the feed screw and having one end engaged with the nut and the other end with the closure plate.

In testimony whereof I affix my signature.

GEORGE KELL. [L. S.]